US 8,830,579 B2

(12) United States Patent
Wu

(10) Patent No.: US 8,830,579 B2
(45) Date of Patent: *Sep. 9, 2014

(54) MICRO-OPTICAL PHASE FILM AND LENTICULAR LENS

(75) Inventor: Jung-Tsung Wu, Tainan (TW)

(73) Assignee: Futis International Ltd., Tainan (TW)

(*) Notice: Subject to any disclaimer, the term of this patent is extended or adjusted under 35 U.S.C. 154(b) by 243 days.

This patent is subject to a terminal disclaimer.

(21) Appl. No.: 13/367,727

(22) Filed: Feb. 7, 2012

(65) Prior Publication Data

US 2012/0224262 A1   Sep. 6, 2012

(30) Foreign Application Priority Data

Mar. 3, 2011   (TW) .............................. 100107138 A

(51) Int. Cl.
| | |
|---|---|
| *G02B 5/30* | (2006.01) |
| *G02B 27/22* | (2006.01) |
| *G02B 3/00* | (2006.01) |
| *G02B 27/26* | (2006.01) |
| *G02F 1/1335* | (2006.01) |
| *H04N 13/04* | (2006.01) |

(52) U.S. Cl.
CPC ...... *G02F 1/133526* (2013.01); *G02B 27/2214* (2013.01); *H04N 13/042* (2013.01); *G02B 3/005* (2013.01); *H04N 13/0454* (2013.01); *H04N 13/0404* (2013.01); *G02B 27/26* (2013.01); *G02B 27/2242* (2013.01); *G02B 5/3083* (2013.01)
USPC ....................... 359/486.02; 359/463; 359/619

(58) Field of Classification Search
USPC .................... 359/237–324, 455, 463, 485.01, 359/486.02, 619–628, 738; 349/96
See application file for complete search history.

(56) References Cited

U.S. PATENT DOCUMENTS

| | | | | |
|---|---|---|---|---|
| 6,368,760 | B1 * | 4/2002 | Nishiguchi ..................... 430/20 |
| 6,618,200 | B2 * | 9/2003 | Shimizu et al. ............... 359/619 |
| 6,850,368 | B2 * | 2/2005 | Shimizu et al. ............... 359/619 |
| 2004/0169920 | A1 * | 9/2004 | Uehara et al. ................. 359/443 |
| 2005/0206130 | A1 * | 9/2005 | Parten .......................... 280/610 |
| 2007/0291369 | A1 * | 12/2007 | Shimura ....................... 359/619 |

* cited by examiner

*Primary Examiner* — Frank Font
(74) *Attorney, Agent, or Firm* — Chih Feng Yeh; Huntington IP Consulting Co., Ltd.

(57) ABSTRACT

The present invention discloses a micro-optical phase film and a micro-lenticular lens. The optical phase film is integrally formed and includes an optical phase film base and a concave surface disposed on the optical phase film base. The concave surface has a plurality of concave and semi-cylinder like protrusions which are separated from each other in a constant pitch and have the same height. A lens layer covers the optical phase film to form a micro-lenticular lens. The optical phase film will exhibit different refractive index because of the incident light with different polarization angles, so as to achieve the object of 2D/3D image switching.

12 Claims, 5 Drawing Sheets

MICRO-OPTICAL PHASE FILM AND LENTICULAR LENS

FIELD OF THE INVENTION

The present invention relates to an integrally formed micro-optical phase film and the manufacturing method thereof, and more particularly to a micro-optical phase film applied to 2D/3D image switching.

BACKGROUND OF THE INVENTION

Stereoscopic display technology is considered as a new generation product target in display technology. From the point of view of the consumer, although the hardware of with glasses type stereoscopic display technology has developed maturely and can meet the demand for enabling stereoscopic images to be viewed by multiple viewers at the same time, it still suffers from a problem in which the viewers must wear special glasses to see the stereoscopic images. Therefore, multiple manufacturers invest in the development of the bare-eye type 3D stereoscopic display technology which does not need to wear special glasses. Thus, the bare-eye type stereoscopic display technology will be the major trend in the future. Actually, the bare-eye type stereoscopic display technology has currently developed into the multi-view display technology which enables multiple viewers to view the stereoscopic images at the same time.

However, text portions of stereoscopic images on the bare-eye type multi-view stereoscopic display may be blurred, which results in the reading problem. Therefore, there is a need for developing a new stereoscopic display system in the hardware technology, which can automatically detect the contents of texts and images and the ranges of the display regions thereof, can display the image portions on the screen in a 3D stereoscopic mode while still displaying the description portions, for example texts and so on, in a traditional 2D mode, and meanwhile can perform dynamic switching between 2D/3D modes in partial display regions.

Switchable stereoscopic image technology for the flat panel television may be principally divided into a parallax barrier technology as shown in FIG. 1a and a lenticular lens technology as shown in FIG. 1b in view of optical control technology. The basic theorem of both is to divide the pictures to be displayed into pixel 111 for the right eye and pixel 112 for the left eye; for the parallax barrier technology, a parallax barrier 120 is utilized to render the right eye 101 to be unable to see the pixel 111 for the left eye 102 and render the left eye 102 to be unable to view the pixel 112 for the right eye 101. Therefore, the right eye 101 and the left eye 102 may see images with different optical phases, in order for the brain to combine them into stereoscopic images. For the lenticular lens technology, lenticular lenses 130 are utilized to refract and transmit the pixel 112 for the right eye 101 and the pixel 111 for the left eye 102 to the right eye 101 and the left eye 102 respectively. Based on the current levels of skill, the images formed by the lenticular lens have better brightness, but the steadiness of the manufacturing process and the technology maturity of the lenticular technology are lower than those of the parallax barrier technology, thereby the parallax barrier technology has the cost advantage relatively. However, both of the aforementioned two technologies are the method of statically presenting the 3D stereoscopic images and cannot perform dynamic switching between 2D/3D images.

FIGS. 2a and 2b illustrate a prior art which can perform dynamic switching between 2D/3D images. The prior art has a switching liquid crystal layer 220, which can change the polarization phase angle of the light through the polarized voltage applied on the polarizing film 210 thereabove and therebelow; a liquid crystal layer 240 which can also change the refraction index thereof by controlling the voltage; a lens layer 250 with a fixed refraction index n. As shown in FIG. 2a, when the polarized voltage (Va) 271 is applied on the polarizing films 210 above and below the switching liquid crystal layer 220, the liquid crystal molecules change the arrangement directions thereof to render the polarized light 280 of zero degree to pass the pixel 201, enter the switching liquid crystal layer 220 and then be transformed into the polarized light 281 of 90 degrees. At this time, the refraction index of the liquid crystal layer 240 is controlled as N, which is different from the refraction index n of the lens layer 250, such that the light changes the traveling direction thereof and the effect equivalent to lenticular lens is generated, which is referred to as the 3D mode. As shown in FIG. 2b, after the polarized voltage (Vb) 272 is applied on the polarizing films 210 above and below the switching liquid crystal layer 220, the liquid crystal molecules change the arrangement directions thereof again to render the polarized light 280 of zero degree to pass the pixel 201, enter the switching liquid crystal layer 220 and then remain as the polarized light 280 of zero degree. But, at this time, the refraction index of the liquid crystal layer 240 is controlled as n, which is the same as the refraction index n of the lens layer 250, such that the light does not change the traveling direction thereof, which is referred to as the 2D mode.

However, the prior art still suffers from several shortcomings. For example, the liquid crystal layer 240 and the lens layer 250 must be made on a glass substrate 230, and another glass substrate 260 is needed on the top of the liquid crystal layer 240 and the lens layer 250. Further, the liquid crystal layer 240 must be controlled by utilizing voltages or other methods to change the refraction index thereof, so as to cooperate with the lens layer 250 to achieve the function of switching between 2D/3D modes.

In comparison with the prior art, the technology disclosed by the present invention can omit the glass substrate and does not need to control the liquid crystal lens to change the refraction index thereof and the lens film is integrally formed, thereby the present invention can significantly reduce the cost.

SUMMARY OF THE INVENTION

The present invention discloses an integrally formed micro-optical phase film and a micro-phase lenticular lens. The structure of the optical phase film includes: an optical phase film base having a thickness and being rectangular from a point of view from top thereof, wherein the optical phase film has two lateral edges with an equal length and two longitudinal edges with an equal length; a concave surface disposed on the optical phase film base; and wherein the concave surface has a plurality of parallel concave and semi-cylinder like protrusions, the plurality of concave and semi-cylinder like protrusions being separated from each other in a constant pitch, a cylinder height being formed between highest points of the concave and semi-cylinder like protrusions and points at which the concave and semi-cylinder like protrusions start to protrude upwards, an angle being formed between axis directions of the concave and semi-cylinder like protrusions and arrangement phases of material molecules of the optical phase film.

The material of the optical phase film may be a transparent material, which includes poly(vinyl chloride) (PVC), polycarbonate (PC), poly(vinyl acetate) (PVA), polyethylene terephthalate (PET), polyethylene (PE), tri-acetyl cellulose (TAC), or cellulose acetate propionate (CAP). The thickness of the optical phase film base is about 50 μm~150 μm, and the constant pitch of the concave and semi-cylinder like protrusions is about 120 μm~450 μm, preferably 150 μm~200 μm. The cylinder height of the concave and semi-cylinder like protrusions is about 10 μm~180 μm. The factor for changing the refraction index of the optical phase film includes the angle between axis directions of the concave and semi-cylinder like protrusions and arrangement phases of material molecules of the optical phase film, the cylinder height of the concave and semi-cylinder like protrusions, the constant pitch of the concave and semi-cylinder like protrusions, or a polarization angle of an incident light.

The present invention discloses a micro-phase lenticular lens, including a lens layer disposed on the concave surface of the aforementioned optical phase film, the lens layer having a refraction index n; and wherein an incident light with a polarization angle enters a planar bottom surface of the optical phase film base and passes through the optical phase film and the lens layer. When the polarization angle of the incident light is a first angle, a refraction index of the optical phase film is N. When the polarization angle of the incident light is a second angle, the refraction index of the optical phase film is n, wherein n is unequal to N.

In one embodiment, the first angle includes zero degree or 180 degrees, and the second angle includes 90 degrees or 270 degrees. In anther embodiment, the first angle includes 90 degrees or 270 degrees, and the second angle includes zero degree or 180 degrees.

BRIEF DESCRIPTION OF THE DRAWINGS

The present invention may be understood by some preferred embodiments and detailed descriptions in the specification and the attached drawings below. The identical reference numbers in the drawings refer to the same components in the present invention. However, it should be appreciated that all the preferred embodiments of the invention are provided only for illustrating but not for limiting the scope of the Claims and wherein:

DETAILED DESCRIPTION OF THE PREFERRED EMBODIMENT

The invention will now be described with the preferred embodiments and aspects and these descriptions interpret structure and procedures of the invention only for illustrating but not for limiting the Claims of the invention. Therefore, except the preferred embodiments in the specification, the present invention may also be widely used in other embodiments.

The present invention discloses an integrally formed micro-optical phase film and a micro-lenticular lens. In comparison with the prior art, the technology disclosed by the present invention can omit the glass substrate and does not need to control the liquid crystal lens to change the refraction index thereof and the phase film is integrally formed, thereby the present invention can significantly reduce the cost and may be utilized to manufacture the optical phase film which can switch 2D/3D images.

Figure 3A:
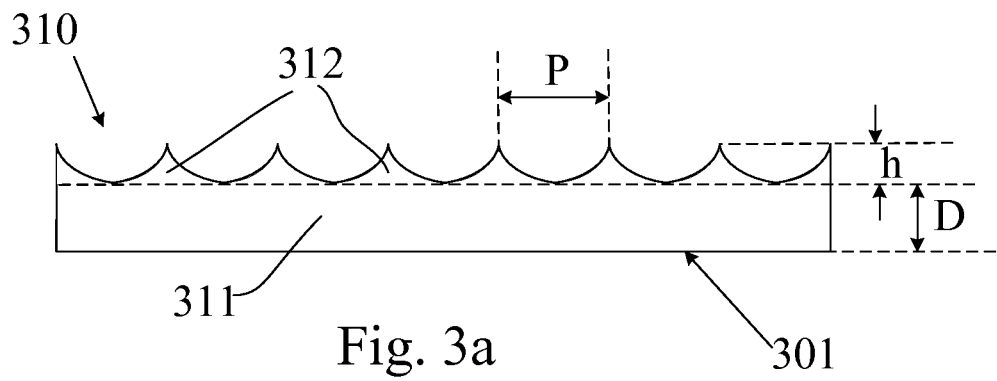
FIGS. 3a-3c illustrate an exemplary integrally formed micro-optical phase film of the present invention.
Figure 3B:
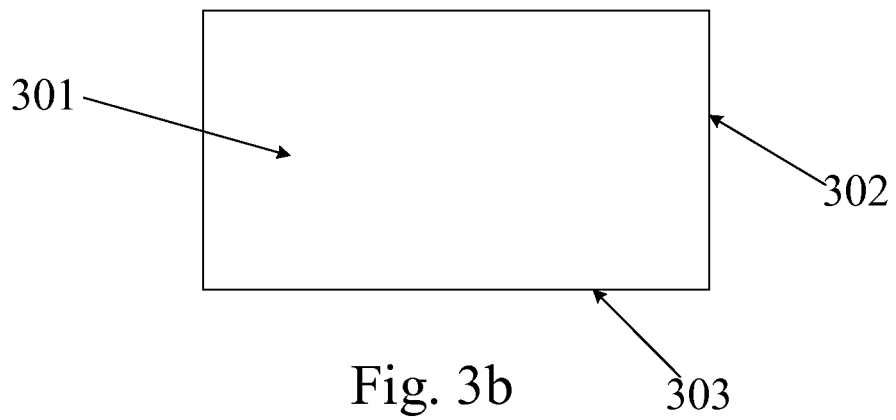

FIG. 3a illustrates a cross-sectional view of the exemplary integrally formed micro-optical phase film 310 made by the present invention. The optical phase film 310 is integrally formed, and the optical phase film 310 may be conceptually divided into an optical phase film base 311 and concave and semi-cylinder like protrusions 312 for convenience of explanation. The bottom surface of the optical phase film base 311 is a planar bottom surface 301. In one embodiment, the thickness of the optical phase film base may be about 50 μm~150 μm. FIG. 3b illustrates a top view of the planar bottom surface 301 of the optical phase film 310. The planar bottom surface 301 is rectangular as shown in FIG. 3b. The lengths of the longitudinal edge 302 and the lateral edge 303 of the planar bottom surface 301 may be designed according to the demand of panels which the optical phase film will cooperate with. The concave and semi-cylinder like protrusions 312 of the optical phase film 310 are separated from each other in a pitch P. In one embodiment, the pitch P may be about 150 μm~200 μm. In another embodiment, the pitch P may be about 120 μm~450 μm. It should be noted that the pitch P may change according to pixel pitches of the panel to be applied in practical application. The axis direction of the concave and semi-cylinder like protrusions 312 may be designed as parallel to the longitudinal edge 302 or the lateral edge 303.

The thickness D of the optical phase film base 311 of the optical phase film 310 may change in accordance with different demands, such as light transmittance, yield of manufacturing processes, hardness, adhesive capacity, etc. The height h of the concave and semi-cylinder like protrusions 312 is from the point at which the concave and semi-cylinder like protrusions 312 start to protrude from the optical phase film base 311 to the highest point of the concave and semi-cylinder like protrusions 312. In one embodiment, the height h may be, but be not limited to, about 10 μm~180 μm. The height h of the concave and semi-cylinder like protrusions 312 affects the curvature of the concave and semi-cylinder like protrusions 312. The height h may be controlled to change the refraction index of the concave and semi-cylinder like protrusions 312. Therefore, the height h may be designed according to practical demands and may not be limited to fixed ranges.

In one embodiment, the material of the optical phase film 310 may be transparent materials, including poly(vinyl chloride) (PVC), polycarbonate (PC), poly(vinyl acetate) (PVA), polyethylene terephthalate (PET), polyethylene (PE), tri-acetyl cellulose (TAC), cellulose acetate propionate (CAP).

Figure 3C:
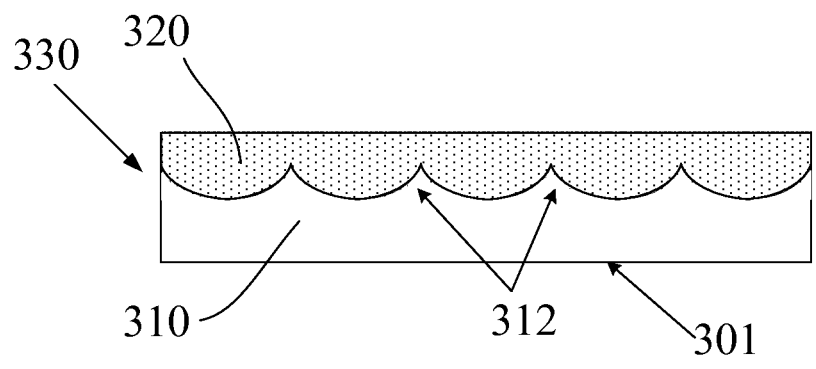

In one embodiment, as shown in FIG. 3c, a lens layer 320 may cover the surface of the concave and semi-cylinder like protrusions 312 of the optical phase film 310 to form a micro-phase lenticular lens 330. The micro-phase lenticular lens 330 may be adhered onto the display panel through the planar bottom surface 301 of the optical phase film 310.

Figure 4:
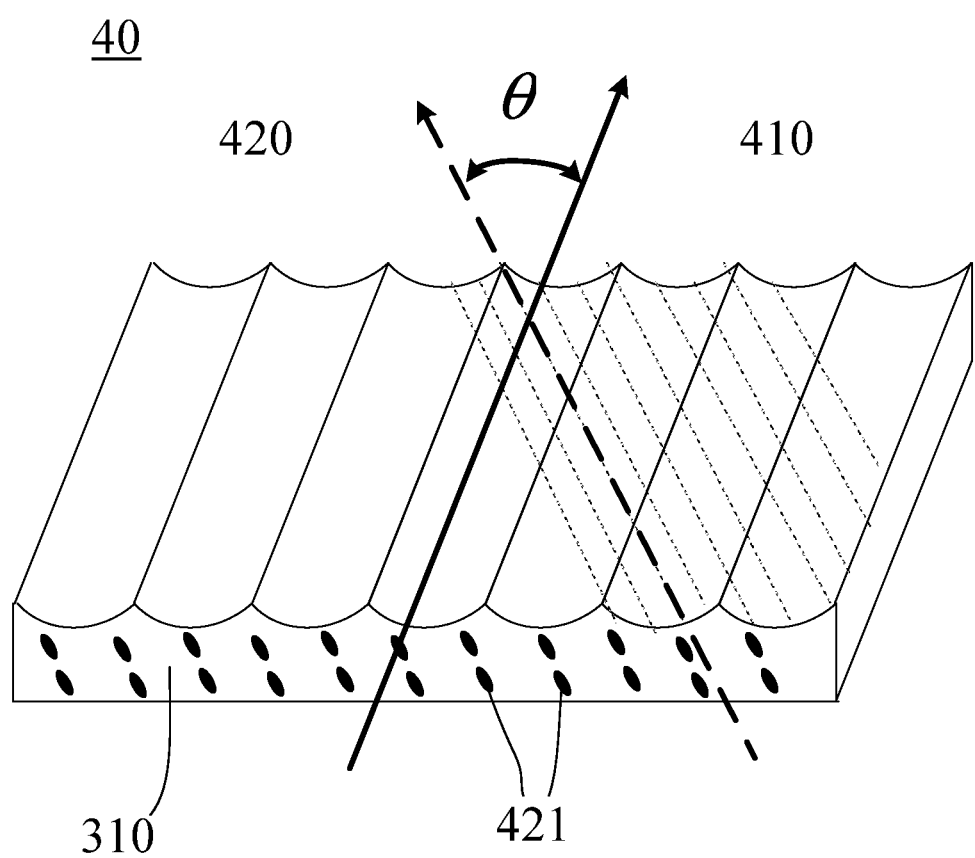
FIG. 4 illustrates the theorem of refraction index variation of the optical phase film of the present invention.

FIG. 4 illustrates the theorem of refraction index variation of the optical phase film 310 of the present invention. As shown in FIG. 4, the material molecules 421 in the optical phase film 310 are regularly arranged along one direction. An angle θ is formed between the axis direction 410 of the concave and semi-cylinder like protrusions of the optical phase film and the phase axis 420 of the material molecules. The angle θ may be controlled to change the refraction index of the optical phase film 310. In one embodiment, the refraction index of the optical phase film 310 may also be changed by adjusting the height h and the pitch P of the concave and semi-cylinder like protrusions 312 of the optical phase film 310.

Figure 1A:
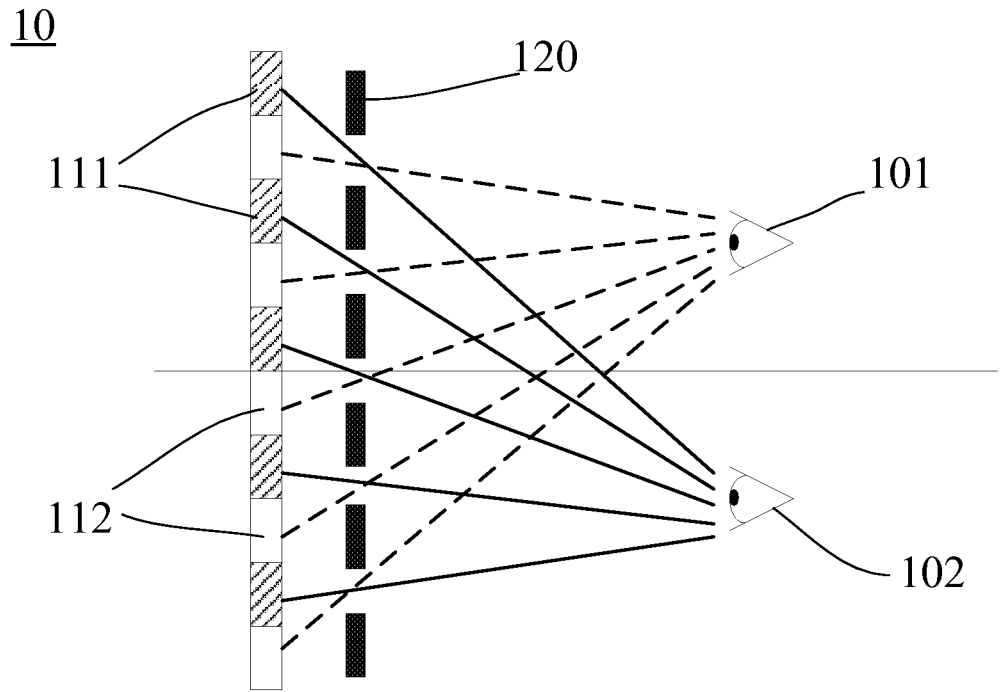
FIGS. 1a and 1b illustrate a prior art of 3D stereoscopic images.
Figure 1B:
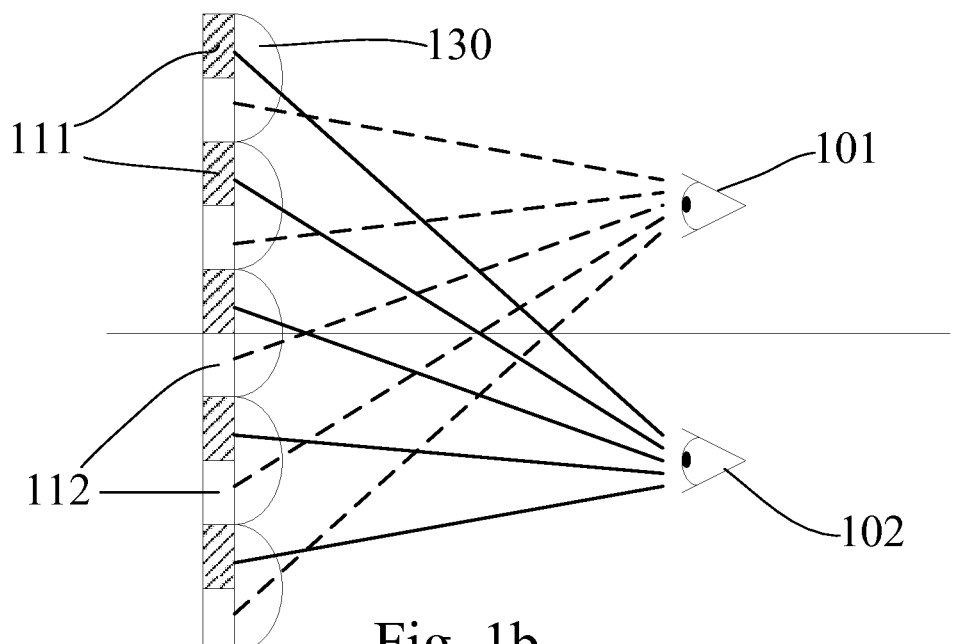
Figures 2A, 2B:
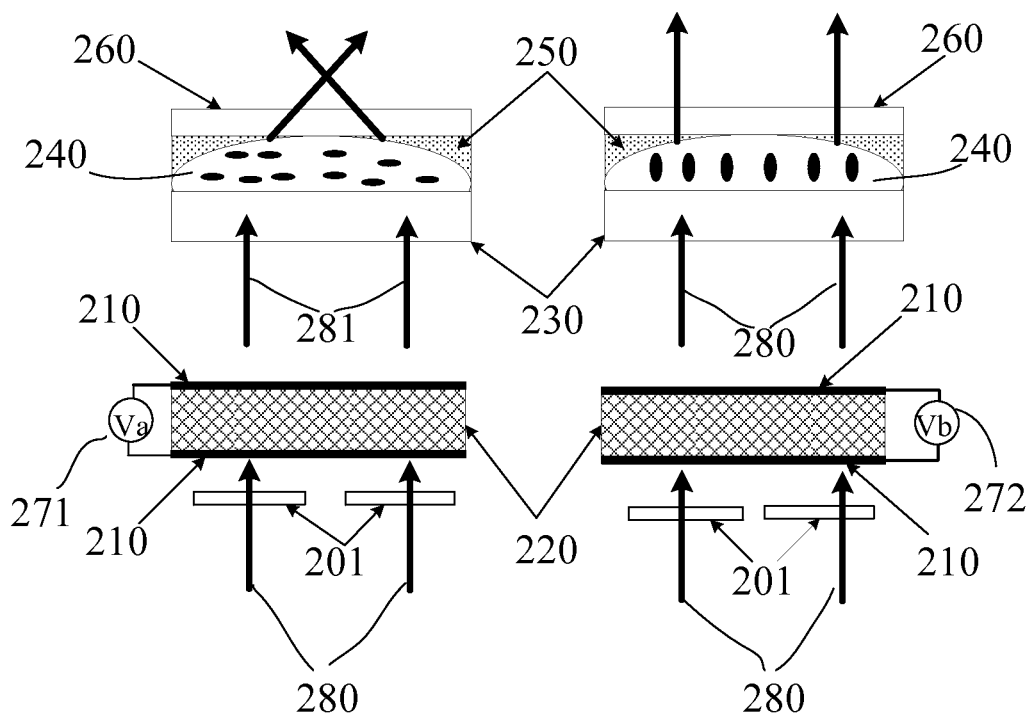
FIGS. 2a and 2b illustrate a prior art of 2D/3D image switching.
Figure 5A:
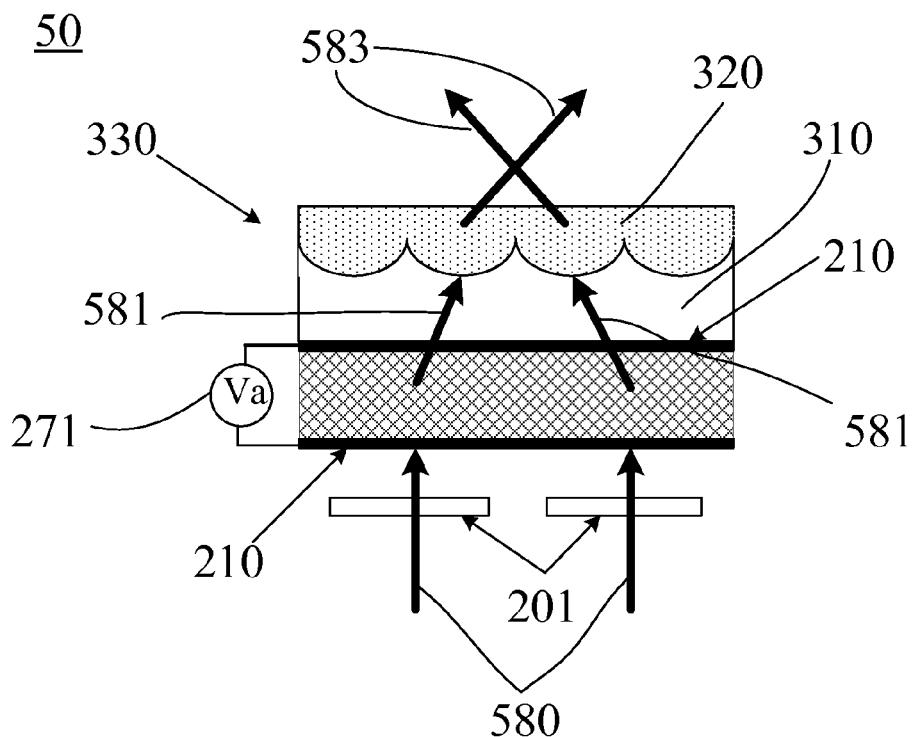
FIGS. 5a and 5b illustrate an exemplary application of the optical phase film of the present invention.
Figure 5B:
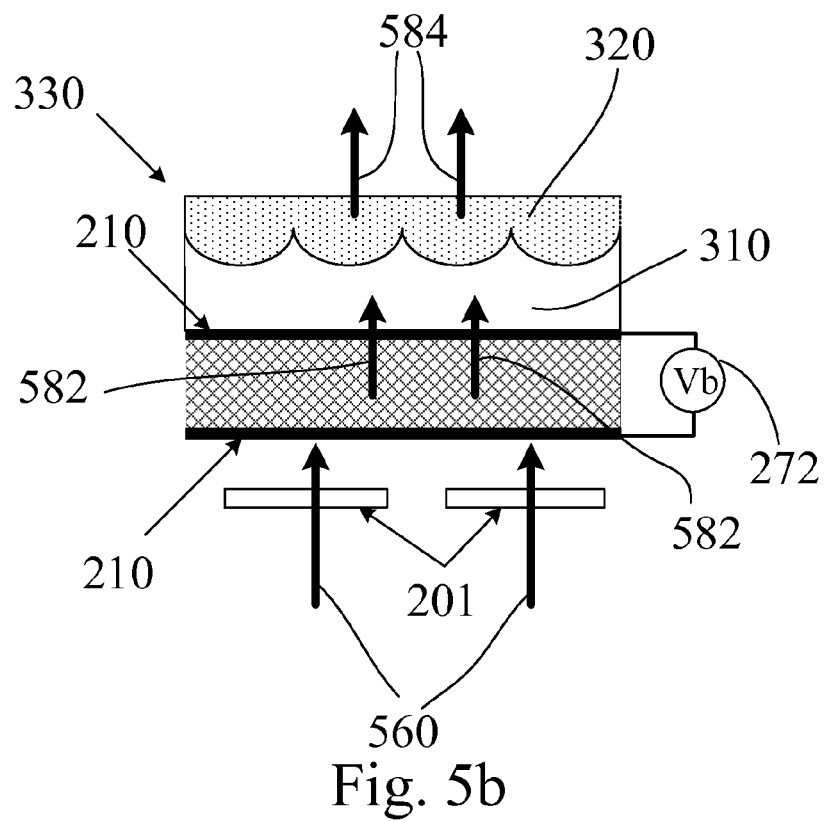

The following will describe the application of the micro-phase lenticular lens 330 of the present invention to the display panel to achieve the function of 2D/3D switching. FIGS. 5a and 5b illustrate the application of the exemplary micro-phase lenticular lens 330 of the present invention. Similar to the prior art in FIGS. 2a and 2b, the micro-phase lenticular lens 330 of the present invention is applied on a display with switching liquid crystal layer 220, and the planar bottom surface 301 of the optical phase film 310 is adhered onto the switching liquid crystal layer 220. As shown in FIG. 5a, if the polarized voltage (Va) 271 is applied on the polarizing films 210 above and below the switching liquid crystal layer 220, the liquid crystal molecules change the arrangement directions thereof to render the incident light 580 with the polarization direction of zero degree to pass the pixel 201, enter the switching liquid crystal layer 220 and then be transformed into the incident light 581 with the polarization direction of 90 degrees or 270 degrees. At this time, the refraction index of the optical phase film 310 is N, which is different from the refraction index n of the lens layer 320, such that the light changes the traveling direction 583 thereof and the effect equivalent to lenticular lens happens, which is the 3D mode. In another embodiment, when the polarized voltage (Va) 271 is applied on the polarizing films 210 above and below the switching liquid crystal layer 220, the liquid crystal molecules change the arrangement directions thereof to render the incident light 580 with the polarization direction of zero degree to pass the pixel 201, enter the switching liquid crystal layer 220 and then become the incident light (not shown) with the polarization direction of zero degree or 180 degrees. At this time, the refraction index of the optical phase film 310 is N, which is different from the refraction index n of the lens layer 320, such that the light changes the traveling direction thereof and the effect equivalent to lenticular lens happens, which is the 3D mode.

Relatively, as shown in FIG. 5b, after the polarized voltage (Vb) 272 is applied on the polarizing films 210 above and below the switching liquid crystal layer 220, the liquid crystal molecules change the arrangement directions thereof again to render the incident light 580 with polarization direction of zero degree to pass the pixel 201, enter the switching liquid crystal layer 220 and then become the incident light 582 with polarization direction of zero degree or 180 degrees. At this time, the refraction index of the optical phase film 310 is n, which is the same as the refraction index n of the lens layer 320, such that the light does not change the traveling direction 584 thereof, which is the 2D mode. In another embodiment, after the polarized voltage (Vb) 272 is applied on the polarizing films 210 above and below the switching liquid crystal layer 220, the liquid crystal molecules change the arrangement directions thereof again to render the incident light 580 with polarization direction of zero degree to pass the pixel 201, enter the switching liquid crystal layer 220 and then be transformed into the incident light (not shown) with polarization direction of 90 degrees or 270 degrees. At this time, the refraction index of the optical phase film 310 is n, which is the same as the refraction index n of the lens layer 320, such that the light does not change the traveling direction thereof, which is the 2D mode.

The foregoing description is a preferred embodiment of the present invention. It should be appreciated that this embodiment is described for purposes of illustration only, not for limiting, and that numerous alterations and modifications may be practiced by those skilled in the art without departing from the spirit and scope of the invention. It is intended that all such modifications and alterations are included insofar as they come within the scope of the invention as claimed or the equivalents thereof.

What is claimed is:

1. A micro-optical phase film, said micro-optical phase film being integrally formed, said micro-optical phase film comprising:
   an optical phase film base having a thickness and being rectangular from a point of view from top thereof, wherein said optical phase film has two lateral edges with an equal length and two longitudinal edges with an equal length;
   a concave surface disposed on said optical phase film base; and
   wherein said concave surface has a plurality of parallel concave and semi-cylinder like protrusions, said plurality of concave and semi-cylinder like protrusions being separated from each other in a constant pitch, a cylinder height being formed between highest points of said concave and semi-cylinder like protrusions and points at which said concave and semi-cylinder like protrusions start to protrude upwards, an angle being formed between axis directions of said concave and semi-cylinder like protrusions and arrangement phases of material molecules of said optical phase film.

2. The micro-optical phase film of claim 1, wherein a factor for changing a refraction index of said optical phase film comprises said angle, said cylinder height of said concave and semi-cylinder like protrusions, said constant pitch of said concave and semi-cylinder like protrusions, or a polarization angle of an incident light.

3. The micro-optical phase film of claim 1, wherein said constant pitch is about 120 μm~450 μm.

4. The micro-optical phase film of claim 1, wherein said constant pitch is about 150 μm~200 μm.

5. The micro-optical phase film of claim 1, wherein said cylinder height is about 10 μm~180 μm.

6. The micro-optical phase film of claim 1, wherein said thickness of said optical phase film base is about 50 μm~150 μm.

7. The micro-optical phase film of claim 1, wherein a material of said optical phase film is a transparent material.

8. The micro-optical phase film of claim 7, wherein said transparent material comprises poly(vinyl chloride) (PVC), polycarbonate (PC), poly(vinyl acetate) (PVA), polyethylene terephthalate (PET), polyethylene (PE), tri-acetyl cellulose (TAC), or cellulose acetate propionate (CAP).

9. A micro-phase lenticular lens, comprising a lens layer disposed on said concave surface of said optical phase film of claim 1, said lens layer having a refraction index n; and wherein an incident light with a polarization angle enters a planar bottom surface of said optical phase film base and passes through said optical phase film and said lens layer.

10. The micro-phase lenticular lens of claim 9, wherein when said polarization angle of said incident light is a first angle, a refraction index of said optical phase film is N, and when said polarization angle of said incident light is a second angle, said refraction index of said optical phase film is n, n being unequal to N.

11. The micro-phase lenticular lens of claim 10, wherein said first angle comprises zero degree or 180 degrees, and said second angle comprises 90 degrees or 270 degrees.

12. The micro-phase lenticular lens of claim 10, wherein said first angle comprises 90 degrees or 270 degrees, and said second angle comprises zero degree or 180 degrees.

\* \* \* \* \*